United States Patent
Higuchi

(10) Patent No.: US 7,177,451 B2
(45) Date of Patent: *Feb. 13, 2007

(54) FINGERPRINT INPUT APPARATUS

(75) Inventor: Teruyuki Higuchi, Shizuoka (JP)

(73) Assignee: NEC Corporation, Tokyo (JP)

( * ) Notice: Subject to any disclaimer, the term of this patent is extended or adjusted under 35 U.S.C. 154(b) by 179 days.

This patent is subject to a terminal disclaimer.

(21) Appl. No.: 10/934,476

(22) Filed: Sep. 7, 2004

(65) Prior Publication Data

US 2005/0025346 A1      Feb. 3, 2005

Related U.S. Application Data

(63) Continuation of application No. 09/494,506, filed on Jan. 31, 2000, now Pat. No. 6,829,375.

(30) Foreign Application Priority Data

Feb. 3, 1999   (JP) ................... 11-026301

(51) Int. Cl.
 *G06K 9/00* (2006.01)
(52) U.S. Cl. ........................................ 382/124
(58) Field of Classification Search ........ 382/115–116,
382/124–127; 356/71; 340/5.53, 5.83
See application file for complete search history.

(56) References Cited

U.S. PATENT DOCUMENTS

| | | |
|---|---|---|
| 4,924,085 A | 5/1990 | Kato et al. |
| 5,416,573 A | 5/1995 | Sartor, Jr. |
| 6,016,355 A | 1/2000 | Dickinson et al. |
| 6,055,324 A | 4/2000 | Fujieda |
| 6,091,839 A | 7/2000 | Uchida |
| 6,115,483 A | 9/2000 | Suga |
| 6,150,665 A | 11/2000 | Suga |
| 6,289,114 B1 | 9/2001 | Mainguet |
| 6,381,347 B1 | 4/2002 | Teng et al. |
| 6,414,297 B1 | 7/2002 | Sasaki et al. |
| 6,636,144 B1 | 10/2003 | Hirakawa |
| 6,636,620 B1 | 10/2003 | Hoshino |

(Continued)

FOREIGN PATENT DOCUMENTS

JP           01-281583           11/1989

(Continued)

*Primary Examiner*—Vikkram Bali
(74) *Attorney, Agent, or Firm*—Whitham, Curtis, Christofferson & Cook, PC

(57) ABSTRACT

A fingerprint input apparatus includes scattered light and a two-dimensional image sensor. The scattered light is generated inside a finger having a fingerprint pattern in accordance with external light. The fingerprint pattern is made up of a ridge portion and a valley portion. The two-dimensional image sensor is made of a large number of light-receiving elements arranged in a two-dimensional array. The image of the fingerprint pattern is input to a light-receiving surface of the light-receiving element. The light-receiving element whose light-receiving surface is in substantially contact with the ridge portion detects as the ridge portion a bright portion where the scattered light emerging from the finger reaches at a high intensity. The light-receiving element whose light-receiving surface corresponds to the valley portion via a space detects as the valley portion a dark portion where the scattering light emerging from the finger reaches at a low intensity.

7 Claims, 2 Drawing Sheets

U.S. PATENT DOCUMENTS

| | | |
|---|---|---|
| 6,829,375 B1 * | 12/2004 | Higuchi .................... 382/124 |
| 2002/0040961 A1 | 4/2002 | Okamoto et al. |
| 2003/0063783 A1 | 4/2003 | Higuchi |
| 2003/0099381 A1 | 5/2003 | Ohba |
| 2003/0118219 A1 | 6/2003 | Higuchi |
| 2003/0194114 A1 | 10/2003 | Mitsuyu et al. |
| 2004/0068669 A1 | 4/2004 | Uchida |

FOREIGN PATENT DOCUMENTS

| | | |
|---|---|---|
| JP | 05-266174 | 10/1993 |
| JP | 06-300930 | 10/1994 |
| JP | 07-171137 | 7/1995 |
| JP | 08-180173 | 7/1996 |
| JP | 11-259638 | 9/1999 |

* cited by examiner

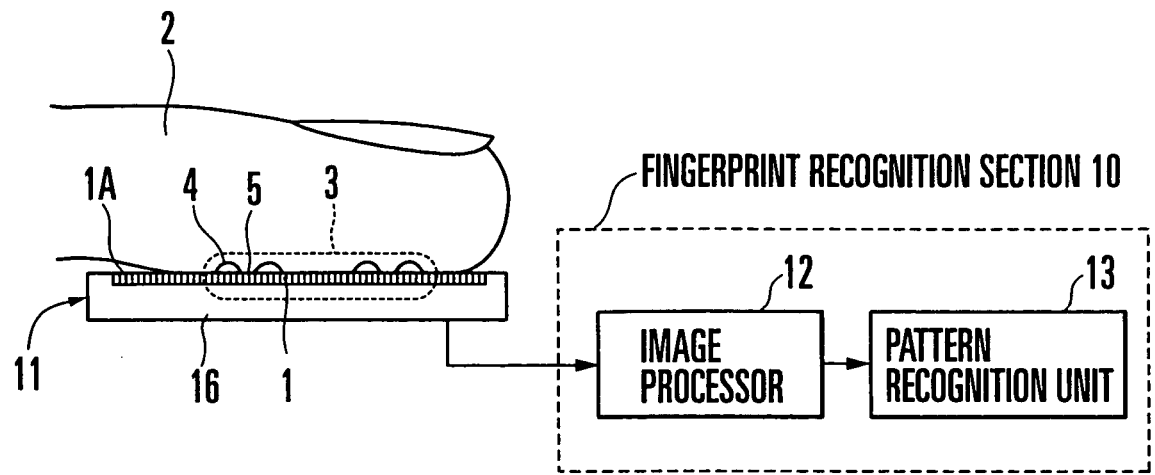
F I G. 1
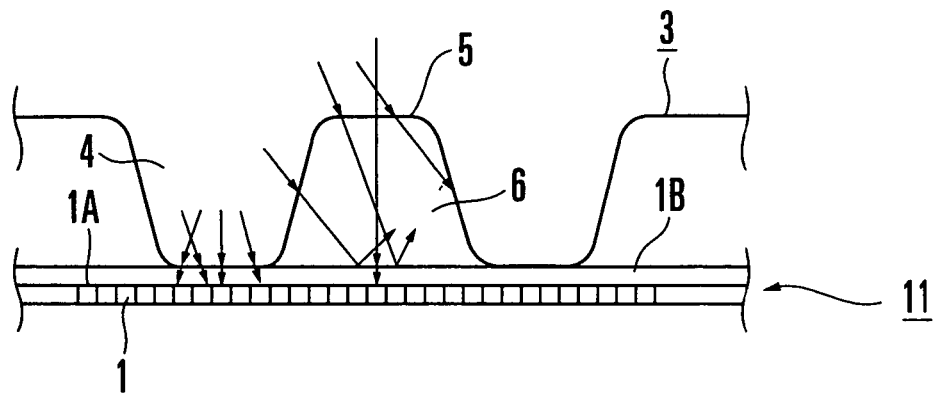
F I G. 2
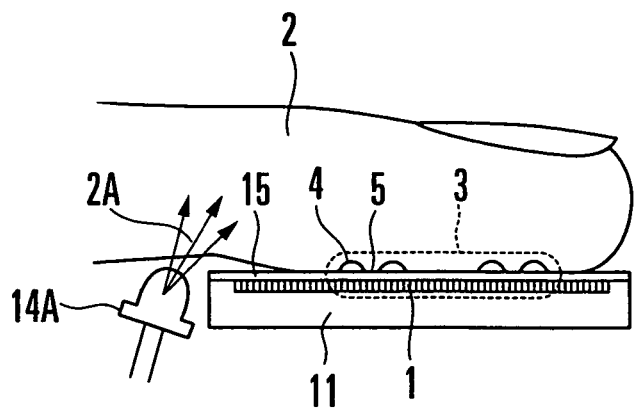
F I G. 3

FINGERPRINT INPUT APPARATUS

CROSS REFERENCE TO RELATED APPLICATION

This application is a continuation of application Ser. No. 09/494,506 filed Jan. 31, 2000 now U.S. Pat. No. 6,829,375, the benefit of the filing date of which is hereby claimed.

BACKGROUND OF THE INVENTION

The present invention relates to a fingerprint input apparatus and, more particularly, to a fingerprint input apparatus capable of directly reading a fingerprint image using a two-dimensional image sensor.

In a conventional fingerprint input apparatus of this type, the skin surface of the fingertip is irradiated with light at a predetermined angle using optical components such as a lens and prism or a fiber. The light reflected by the skin surface is focused to output a fingerprint image. Alternatively, a study has been made on a scheme of directly inputting a fingerprint image using an electrostatic capacitance instead of obtaining a fingerprint image using the optical system.

In these conventional fingerprint input apparatuses, when the optical components such as a lens and prism or a fiber are used, a space for the sizes of these optical components and their mounting positions is required to result in a large thickness and size of the apparatus. In addition, since these optical components are relatively expensive, the apparatus cannot be manufactured at low cost. When the fingerprint image is optically processed using these optical components, the resultant image tends to distort.

The scheme of directly inputting a fingerprint image using the electrostatic capacitance is susceptible to external static electricity and difficult to obtain a high sensitivity.

SUMMARY OF THE INVENTION

It is an object of the present invention to provide a relatively low-profile, compact, inexpensive fingerprint image input apparatus.

It is another object of the present invention to provide a fingerprint image input apparatus capable of obtaining an image free from distortion.

In order to achieve the above objects of the present invention, there is provided a fingerprint input apparatus comprising scattered light generated inside a finger having a fingerprint pattern in accordance with external light, the fingerprint pattern being made up of a ridge portion and a valley portion, and a two-dimensional image sensor made of a large number of light-receiving elements arranged in a two-dimensional array, an image of the fingerprint pattern being input to a light-receiving surface of the light-receiving element, wherein the light-receiving element whose light-receiving surface is in substantially contact with the ridge portion detects as the ridge portion a bright portion where the scattered light emerging from the finger reaches at a high intensity, and the light-receiving element whose light-receiving surface corresponds to the valley portion via a space detects as the valley portion a dark portion where the scattering light emerging from the finger reaches at a low intensity.

BRIEF DESCRIPTION OF THE DRAWINGS

FIG. 1 is a view showing the schematic arrangement of a fingerprint input apparatus according to the first embodiment of the present invention;

FIG. 2 is a view showing the light-receiving state of a two-dimensional image sensor shown in FIG. 1;

FIG. 3 is a view showing the schematic arrangement of a fingerprint input apparatus according to the second embodiment of the present invention;

DESCRIPTION OF THE PREFERRED EMBODIMENTS

Figure 4:
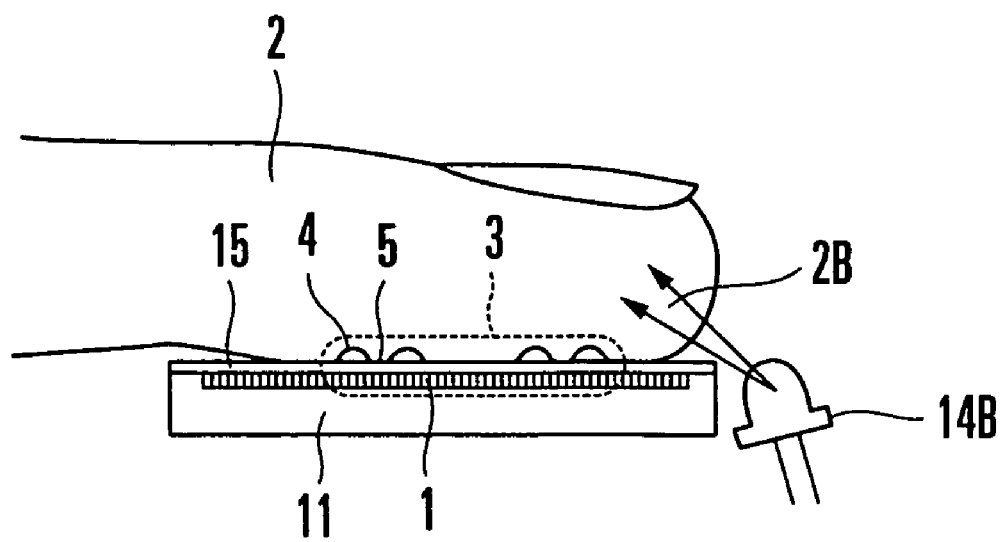
FIG. 4 is a view showing the schematic arrangement of a fingerprint input apparatus according to the third embodiment of the present invention.

The present invention will be described in detail with reference to the accompanying drawings.

FIG. 1 shows a fingerprint input apparatus according to the first embodiment of the present invention. Referring to FIG. 1, reference numeral 11 denotes a two-dimensional image sensor (to be referred to as an image sensor hereinafter) for two-dimensionally detecting the light intensity in accordance with the three-dimensional pattern of a skin surface 3 of a finger 2; 12, an image processor for image-processing an output from the image sensor 11 to generate a fingerprint pattern; and 13, a pattern recognition unit for extracting the features of the fingerprint pattern generated by the image processor 12 and recognizing the pattern by comparing the extracted features with a predetermined reference pattern.

The image sensor 11 comprises a substrate 16 and a large number of light-receiving elements 1 two-dimensionally arranged in a matrix on the substrate 16. A two-dimensional image is formed on the basis of an output from each light-receiving element 1. As shown in FIG. 2, a transparent cover 1B comprising a transparent member made of glass is formed on the image sensor 11 to protect a light-receiving surface 1A of each light-receiving element 1.

The pitch of the light-receiving elements 1 must be smaller than the pitch of ridge portions (projections) 4 or valley portions (recesses) 5 of the skin surface 3. If the pitch of the light-receiving elements 1 is 50 μm or less, an image having precision enough to perform pattern recognition can be obtained. A CCD (Charge-Coupled Device) sensor is used as the image sensor 11.

In this embodiment, scattered light emerging from the finger 2 is generated by ambient light of the finger 2 without using any light source. The image processor 12 and pattern recognition unit 13 construct a fingerprint recognition section 10 and can be made up of known circuits.

To recognize the skin surface 3 of the finger 2, as shown in FIG. 2, the finger 2 is placed on the image sensor 11 such that the skin surface 3 is in contact with the transparent cover 1B. At this time, the ridge portions 4 of the skin surface 3 are in contact with the transparent cover 1B of the image sensor 11. Scattered light from the inside of the finger 2 is directly received from the ridge portions 4 to the light-receiving elements 1 via the transparent cover 1B.

A space 6 is formed between the transparent cover 1B and each valley portion 5 of the skin surface 3. Scattered light emerging from the finger 2 to the space 6 via the valley portion 5 is refracted and scattered at the interface between the skin and air and is then diffused in the space 6. The amount of light reaching the light-receiving element via the space 6 greatly reduces.

Part of light reaching the transparent cover 1B is reflected on the surface of the transparent cover 1B due to the relationship between the incident angle on the transparent cover 1B and the refractive indices of the air and transparent cover 1B in the space 6. While light from the ridge portion 4 directly contacting the transparent cover is detected at a high intensity, while light reaching from the valley portion 5 via the space 6 is detected at a low intensity. Therefore, the ridge portion 4 is detected as a bright portion, while the valley portion 5 is detected as a dark portion.

As described above, the light-receiving elements 1 whose light-receiving surfaces 1A are almost in contact with the ridge portions 4 detect as the ridge portion 4 the bright portion that the scattered light from the inside of the finger 2 reaches at a high intensity. The light-receiving elements 1 whose light-receiving surfaces 1A correspond to the valley portion 5 and the space 6 detect as the valley portion 5 the dark portion where scattered light from the inside of the finger 2 reach at a low intensity.

According to this embodiment, the optical components such as a lens and prism or a fiber are not required. As compared with a conventional structure, limitations on the physical sizes by the sizes of optical components themselves and their mounting positions can be eliminated. For example, a low-profile, compact fingerprint input apparatus having a size enough to be incorporated in an IC card required for verification of a cardholder can be implemented. Since optical processing by optical components need not be performed, special image correction processing need not be performed to obtain a fingerprint image free from distortion, thereby increasing the recognition ratio of the fingerprint pattern.

FIG. 3 shows the schematic arrangement of a fingerprint input apparatus according to the second embodiment of the present invention.

In the first embodiment, the scattered light from the inside of the finger 2 is generated by the ambient light of the finger 2. For this reason, any special light source need not be provided. However, when a fingerprint input apparatus is used in a place where no ambient light is available, a light source such as an LED (Light-Emitting Diode) is arranged to irradiate the finger 2.

Referring to FIG. 3, reference numeral 14A denotes a light source arranged on the same surface side as that of an image sensor 11 so as to oppose a finger pad portion 2A of a finger 2. The finger pad portion 2A is irradiated upward with light from the light source 14A to generate scattered light inside the finger 2. As compared with the case in which the light source is disposed above the finger 2 to irradiate it, the light source does not interfere with operation of placing the finger 2 on the image sensor 11, thereby implementing an easy-to-handle apparatus for a user.

Since the distance between the light source 14A and the finger 2 is very small, light from the light source 14A can be guided to the inside of the finger 2 to allow effectively generating scattered light. Since the light from the light source 14A does not directly reach a light-receiving element 1, the contrast is suppressed to reduce noise.

The fingertip of the finger 2 may be obliquely irradiated with light from the light source 14A. In this case, scattered light can be efficiently generated inside the finger 2.

FIG. 4 shows the schematic arrangement of a fingerprint input apparatus according to the third embodiment of the present invention.

Referring to FIG. 4, reference numeral 14B denotes a light source arranged on the same surface side as that of an image sensor 11 so as to oppose a fingertip portion 2B of a finger 2. The fingertip portion 2B is irradiated obliquely upward with light from the light source 14B to generate scattered light inside the finger 2.

According to this embodiment, since the fingertip portion 2B has an almost hemispherical surface curved downward in the forward direction, scattered light can be uniformly generated inside the finger 2 upon irradiating the finger 2 with the light from the light source 14B.

Figure 5:
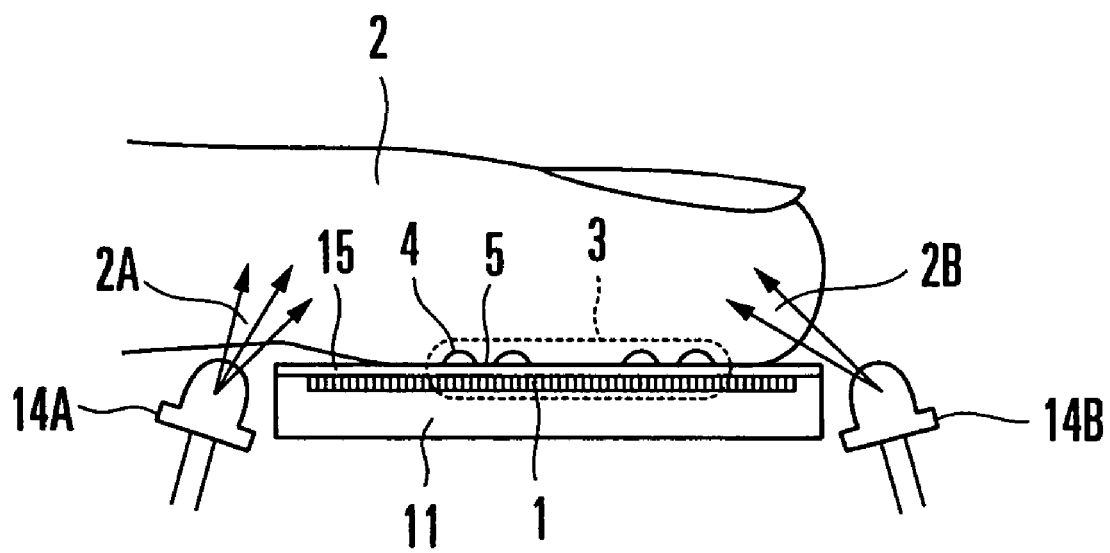
FIG. 5 is a view showing the schematic arrangement of a fingerprint input apparatus according to the fourth embodiment of the present invention.

FIG. 5 shows the schematic arrangement of a fingerprint input apparatus according to the fourth embodiment of the present invention.

Referring to FIG. 5, a pair of light sources 14A and 14B as in those shown in FIGS. 3 and 4 can be arranged to interpose an image sensor 11 between them.

Light sources for emitting near-infrared rays, e.g., near-infrared LEDs can be used as the light sources 14A and 14B, and a thin film filter 15 for transmitting near-infrared rays and reducing disturbance light such as visible light can be arranged, as shown in FIG. 3. In this case, an image sensor capable of receiving a near-infrared ray must be selected as the image sensor 11. A general CCD image sensor can receive the near-infrared rays.

According to this modification, since disturbance light such as light from a fluorescent lamp or sunbeam can be reduced, noise caused by the disturbance light can be reduced to allow efficiently inputting a fingerprint image even in an environment where a large number of disturbance light components are present. A transparent cover 1B may be comprised of a cover having the function of a filter 15. In this case, the number of components can be reduced.

As has been described above, according to the present invention, optical components such as a lens and prism or a fiber can be omitted. For this reason, as compared with a conventional structure, limitations on the physical sizes by the sizes of optical components themselves and their mounting positions can be eliminated. A low-profile, compact apparatus can be implemented.

Since optical processing by the optical components need not be performed, a fingerprint image free from distortion can be obtained without performing special image correction processing. The recognition ratio of the fingerprint pattern can increase.

What is claimed is:

1. An imaging sensor adapted to generate an electrical signal representing and image of a skin surface of a finger, said image sensor comprising:

a transparent cover having first and second surfaces; and a plurality of light responsive elements arranged under said second surface of said cover, when said first surface of said cover is in contact with said skin surface of said finger, said light responsive elements being responsive only to light directly emerging from an inside of said finger through said cover to generate said electrical signal representing said image of said skin surface of a finger.

2. An image sensor adapted to generate an electrical signal representing an image of a skin surface of a finger, said image sensor comprising a plurality of light responsive elements, at least one of which is disposed between a ridge and a valley of a fingerprint, light from outside said finger entering said finger and emerging from said finger as scattered light, said plurality of light responsive elements generating said electrical signal representing an image of a skin surface of a finger only from scattered light directly emerging from an inside of said finger and not reflected light from outside of said finger.

3. An image sensor adapted to generate an electrical signal representing an image of a skin surface of a finger, said image sensor comprising:

a transparent cover having first and second surfaces; and a plurality of light responsive elements arranged under said second surface of said cover, when said first surface of said cover is in contact with said skin surface of said finger, said plurality of light responsive elements generating said electrical signal representing an image of a skin surface of a finger from scattered light directly emerging from an inside of said finger without a light source under said transparent cover.

4. An image sensor adapted to generate an electrical signal representing an image of a skin surface of a finger, said image sensor comprising:

a transparent cover having first and second surfaces; and a plurality of light responsive elements arranged under said second surface of said cover, when said first surface of said cover is in contact with said skin surface of said finger, said plurality of light responsive elements generating said electrical signal representing an image of a skin surface of a finger from scattered light directly emerging from an inside of said finger without a light source irradiating said skin surface in contact with said cover.

5. An imaging sensor adapted to generate an electrical signal representing and image of a skin surface of a finger, said image sensor comprising:

a transparent cover having first and second surfaces; and a plurality of light responsive elements arranged under said second surface of said cover, when said first surface of said cover is in contact with said skin surface of said finger, said light responsive elements being responsive to light directly emerging from an inside of said finger through said cover to generate said electrical signal representing said image of said skin surface of a finger, wherein no optical component is interposed between said transparent cover and said plurality of light responsive elements.

6. An image sensor adapted to generate an electrical signal representing an image of a skin surface of a finger, said image sensor comprising:

a transparent cover having first and second surfaces; and a plurality of light responsive elements arranged under said second surface of said cover, when said first surface of said cover is in contact with said skin surface of said finger, said plurality of light responsive elements generating said electrical signal representing an image of a skin surface of a finger from scattered light directly emerging from an inside of said finger, wherein no optical component is interposed between said transparent cover and said plurality of light responsive elements.

7. A fingerprint input apparatus for inputting a fingerprint of a tip of a finger having ridge and valley portions, said fingerprint input apparatus comprising:

a number of light receiving elements arranged in a two-dimensional matrix; and a transparent cover that protects a light receiving surface of said light receiving elements, wherein when a finger is placed on said transparent cover, and wherein no dedicated light source is required, a bright area is detected as a ridge portion, said bright area is such an area which a diffusion light sufficiently reaches from an inside of a finger via said ridge portion, said bright area is detected by a light receiving element having a light receiving surface close to said ridge portion, and a dark area is detected as a valley portion, said dark area is such an area which a diffusion light hardly reaches from an inside of a finger, and said dark area is detected by a light receiving element having a light receiving surface close to said valley portion.

* * * * *